(12) United States Patent
Ochi et al.

(10) Patent No.: US 6,711,964 B2
(45) Date of Patent: Mar. 30, 2004

(54) CONTROL DEVICE FOR AUTOMATIC TRANSMISSION AND CONTROL METHOD THEREFOR

(75) Inventors: Tatsuya Ochi, Hitachi (JP); Toshimichi Minowa, Mito (JP); Takashi Okada, Hitachi (JP); Mitsuo Kayano, Hitachi (JP); Hiroshi Sakamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/855,782

(22) Filed: May 16, 2001

(65) Prior Publication Data

US 2002/0066328 A1 Jun. 6, 2002

(30) Foreign Application Priority Data

Dec. 1, 2000 (JP) ........................................ 2000-371479

(51) Int. Cl.[7] ........................... F16H 59/24; F16H 61/26
(52) U.S. Cl. .................... 74/337; 477/156; 477/159; 477/904
(58) Field of Search ................. 477/156, 158, 477/159, 904; 74/335, 336 R, 337, 356, 357, 333

(56) References Cited

U.S. PATENT DOCUMENTS

| | | | | |
|---|---|---|---|---|
| 5,129,286 A | * | 7/1992 | Nitz et al. | 477/102 |
| 5,580,332 A | * | 12/1996 | Mitchell et al. | 477/143 |
| 5,588,327 A | * | 12/1996 | Downs et al. | 74/335 |
| 5,674,150 A | * | 10/1997 | Morishita et al. | 477/39 |
| 5,902,344 A | * | 5/1999 | Eike et al. | 701/67 |
| 5,910,175 A | * | 6/1999 | Malson | 477/156 X |
| 6,078,856 A | * | 6/2000 | Malson | 477/156 X |
| 6,397,695 B1 | * | 6/2002 | Okada et al. | 74/335 |
| 6,427,551 B2 | * | 8/2002 | Iizuka et al. | 74/359 |

FOREIGN PATENT DOCUMENTS

| | | |
|---|---|---|
| JP | 2000-65199 | 3/2000 |
| WO | WO00/32960 | 6/2000 |

OTHER PUBLICATIONS

Abstract of Onishi et al. (JP 2000–65199)—Published Mar. 3, 2000.*

* cited by examiner

*Primary Examiner*—Ha Ho
(74) *Attorney, Agent, or Firm*—Crowell & Moring LLP

(57) ABSTRACT

A control device for an automatic transmission has a torque transmission provided between an input shaft and an output shaft of a gear-type transmission The torque transmission in at least one change gear stage is a friction clutch. When performing a change gear from one change gear stage to another change gear stage, the friction clutch is controlled. A transfer torque capacity detector detects or computes transfer torque of the friction clutch when performing a change gear to a predetermined change gear stage, and a clutch release timing determining apparatus determines a timing when releasing the claw-type clutch into a neutral state based on the value detected or computed by the torque capacity detector.

12 Claims, 8 Drawing Sheets

CONTROL DEVICE FOR AUTOMATIC TRANSMISSION AND CONTROL METHOD THEREFOR

BACKGROUND OF THE INVENTION

1. Field of the Invention

The present invention relates to a control device for an automatic transmission and a control method therefor in an automobile.

2. Conventional Art

An example of conventional art of a control device for an automobile using a mechanism of a gear type transmission is disposed in JP-A-2000-65199.

In the above conventional art, a friction clutch is provided at a gear effecting the minimum change gear ratio in the gear type transmission, thereby, during a change gear, an input shaft rpm of the transmission is reduced through coupling with the friction clutch and a torque reduction during the change gear is compensated by a torque transmitted through the friction clutch to achieve a smooth change gear.

When performing a change gear with such gear type transmission, based on the change gear judgement from a control device together with the coupling with the friction clutch, a claw type clutch is generally released to a neutral state and the torque transmission train in the multi stage change gear mechanism is switched to perform a change gear.

In the conventional change gear which is performed by controlling both clutches for the coupling and for the releasing, so called change gear by clutch switching or rebridging, the control is performed so as to prevent a tie-up in which the both clutches are placed in a coupling condition (over lap condition) or to prevent a condition in which the both clutches are placed in a released condition (under lap condition). More specifically, such a control is performed in that a torque capacity of the friction clutch to be coupled is gradually increased and in response to a detection that a predetermined time has passed after a change gear judgement, the claw type clutch is released to a neutral state.

However, because of initial variation due to individual product differences and of characteristic variation due to such as secular change, such as the over lap condition and the under lap condition between the friction clutch and the claw type clutch are caused in the clutch switching change gear, which arises a problem of extremely deteriorating a feeling during the change gear.

SUMMARY OF THE INVENTION

Accordingly, an object of the present invention is to provide a control device for an automatic transmission which, at the time of clutch switching change gear of a friction clutch and a claw type clutch, a torque capacity of the friction clutch to be coupled is detected or computed and based on the detected or computed value a timing when the claw type clutch to be released is released into a neutral state is determined, thereby, a stable clutch switching is always realized with respect to initial variation due to individual product differences and characteristic variation due to secular changes thereof and a desirable change gear quality is ensured.

In order to resolve the above problems, the present invention provides a control device for an automatic transmission which comprises a torque transmission means provided between an input shaft and an output shaft of a gear type transmission, wherein the torque transmission means in at least one change gear stage is constituted by a friction clutch, the torque transmission means in the other change gear stages are constituted by claw type clutches and when performing a change gear from one change gear stage to another change gear stage, the friction clutch is controlled, and further comprises, a torque capacity detecting means which detects or computes torque capacity of the friction clutch when performing a change gear to a predetermined change gear stage and a clutch release timing determining means which determines a timing when releasing the claw type clutch into a neutral state based on the value detected or computed by the torque capacity detection means.

Preferably, the torque capacity detection means in the control device for the automatic transmission is a hydraulic pressure sensor.

Further preferably, the torque capacity detection means in the control device for the automatic transmission is an acceleration sensor.

Further preferably, the torque capacity detection means in the control device for the automatic transmission is an output shaft rpm variation rate detector.

Still further, the present invention provides a method of controlling an automatic transmission, which comprises a torque transmission means provided between an input shaft and an output shaft of a gear type transmission, wherein the torque transmission means in at least one change gear stage is constituted by a friction clutch, the torque transmission means in the other change gear stages are constituted by claw type clutches and when performing a change gear from one change gear stage to another change gear stage, the friction clutch is controlled, comprises, the steps of detecting that the friction clutch has acquired a predetermined amount of torque capacity when performing a change gear to a predetermined change gear stage and determining a timing when releasing the claw type clutch based on the detection of the predetermined amount of torque capacity.

DETAILED DESCRIPTION OF THE PREFERRED EMBODIMENTS

Hereinbelow, embodiments of the present invention will be explained with reference to the drawings.

Figure 1:
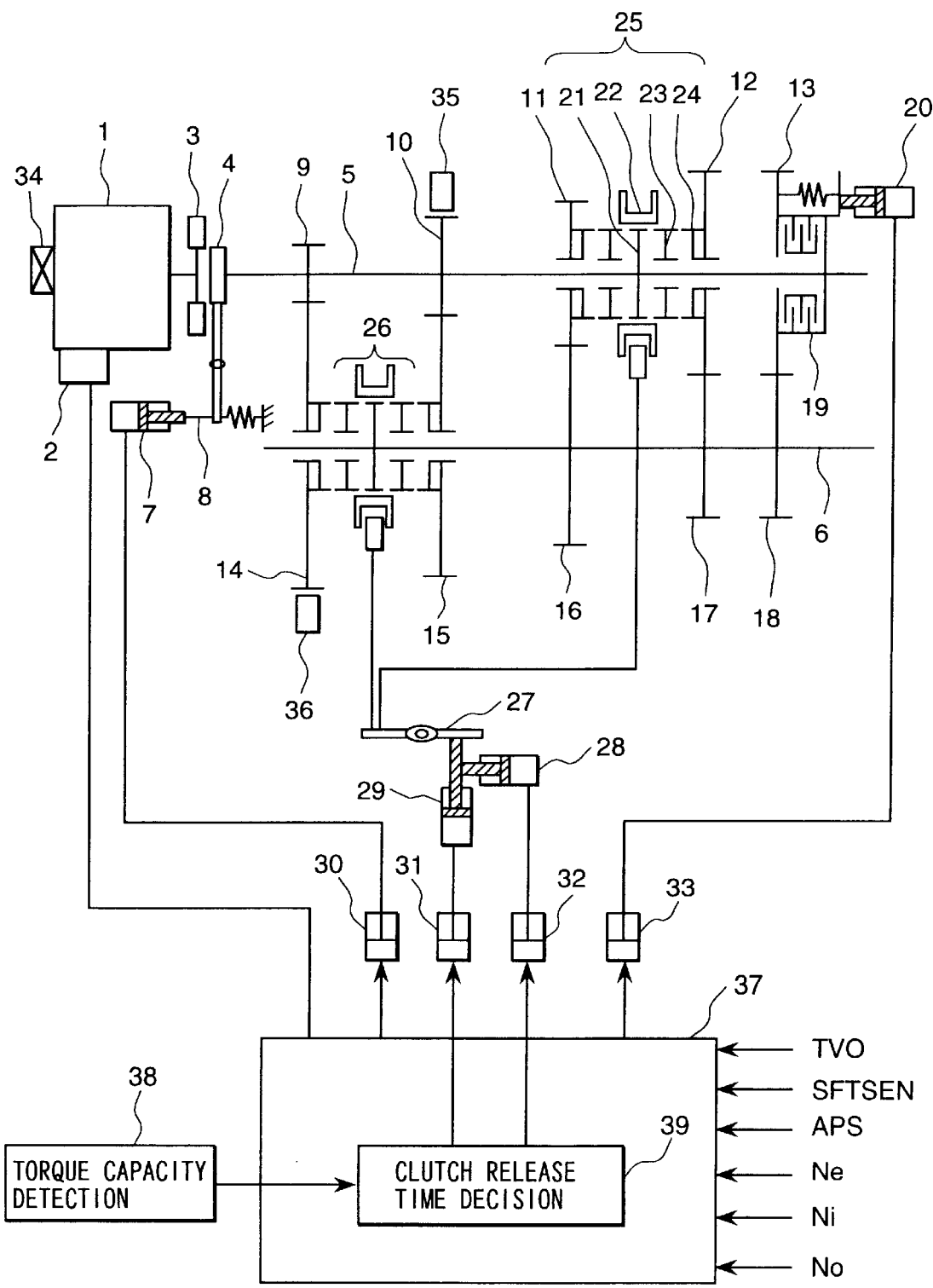
FIG. 1 is a structural diagram of an automatic transmission and a control device therefor representing one embodiment of the present invention.

FIG. 1 is a structural diagram of an automatic transmission and a control device therefor according to one embodiment of the present invention.

An engine 1 is provided with an electronically controlled throttle 2 which regulates engine torque and an rpm sensor 34 which measures an rpm of the engine 1, with which the torque is controlled in a high accuracy. The torque generated by the engine 1 is transmitted to an output shaft 6 via a clutch 4 and a gear type transmission mechanism provided between the engine 1 and the output shaft 6. The coupling and releasing of the clutch 4 is performed by hydraulic pressure of a cylinder 7. The hydraulic pressure of the cylinder 7 acts on the clutch 4 via a wire 8, and when the clutch 4 is pressed to a fly wheel 3 at the engine side, a coupling is effected.

A base structure of a gear type transmission is formed by an input shaft 5, the output shaft 6 and a plurality of gears secured to respective shafts constituting respective change gear stages.

The torque from the engine 1 is transmitted via the clutch 4 from the input shaft 5 to the output shaft 6 via gears used for every change gear stage. Among these plurality of gears gears 9 and 10 are rotated while being secured to the input shaft 5, and gears 16, 17 and 18 are rotated while being secured to the output shaft 6. The other gears idle with respect to the respective shafts.

Each of claw type clutches 25 and 26 is constituted by a clutch hub 21, a sleeve 22, a synchronizer ring 23 and a gear spline 24, i.e., a synchromesh arrangement. The claw type clutches 25 and 26 effect the coupling and releasing by stroking a shaft fork 27 and, during the coupling, cause to rotate adjacent gears in synchronism with idling shafts, and further, during the releasing in which a neutral state is assumed, the adjacent gears are placed under an idle condition to interrupt a drive force transmission. The shaft fork 27 is operated by hydraulic pressure acting on cylinders 28 and 29.

The gears 10 and 14 are used as rpm detectors for the respective shafts to which the respective gears are secured, and through the rpm sensors 35 and 36 an input shaft rpm Ni and the output shaft rpm No can be detected.

A gear 13 secured to the input shaft 5 includes a friction clutch 19 and through coupling of the friction clutch 19 a torque transmission from the input shaft 5 to the output shaft 6 via the gear 18 can be performed. The friction clutch 19 is constituted by a wet type multi plate clutch and performs the coupling and releasing thereof by hydraulic pressure acting on a piston 20. In the present embodiment as shown in FIG. 1, a structure in which the friction clutch 19 is secured to the input shaft is used, however, the drive force can be transmitted to the output shaft by newly providing a third shaft and by securing the friction clutch 19 to the third shaft.

When performing a change gear in an usual manual transmission, the clutch 4 is released and the torque transmission from the engine 1 to the output shaft 6 is temporarily interrupted. During the interruption through operation of the claw type clutches 25 and 26 a gear is selected so as to assume a predetermined change gear ratio and thereafter through recoupling of the clutch 4 the change gear is effected. With such change gear since a torque interruption during the change gear is generated which gives a sense of incongruity to a driver and a passenger. However, with the gear type transmission mechanism as shown in FIG. 1, the change gear is effected by reducing the rpm of the input shaft 5 while slipping the friction clutch 19 under a condition where the clutch 4 is coupled, the torque interruption during the change gear is suppressed and a desirable change gear characteristic is realized.

Now, a control device 37 which controls the engine 1 and actuators 30, 31, 32 and 33 will be explained. To the control device 37 signals representing a throttle valve opening degree TVO, an acceleration pedal depression amount APS, a claw type clutch position SFTSEN, an engine rpm Ne detected by the rpm sensor 34, an input shaft rpm Ni detected by the rpm sensor 35 and an output shaft rpm No detected by the rpm sensor 36 are inputted. In response thereto the control device 37 computes a throttle valve opening degree, fuel amount and ignition timing so as to generate a required engine torque and controls the respective actuators, for example, the electronically controlled throttle 2.

Further, a torque capacity detection means 38 detects a torque capacity of the friction clutch 19 at the initial period of the change gear and inputs the same into the control device 37. By making use of the input value a release timing deciding means 39 decides an optimum timing for releasing the claw type clutches 25 and 26 into a neutral state and controls the actuators 31 and 32.

With thus constituting the control device 37, the clutch switching timing is optimized, the over lap condition and the under lap condition of the friction clutch to be coupled and the claw type clutch to be released are prevented and a desirable change gear characteristics can be realized.

Figure 2:
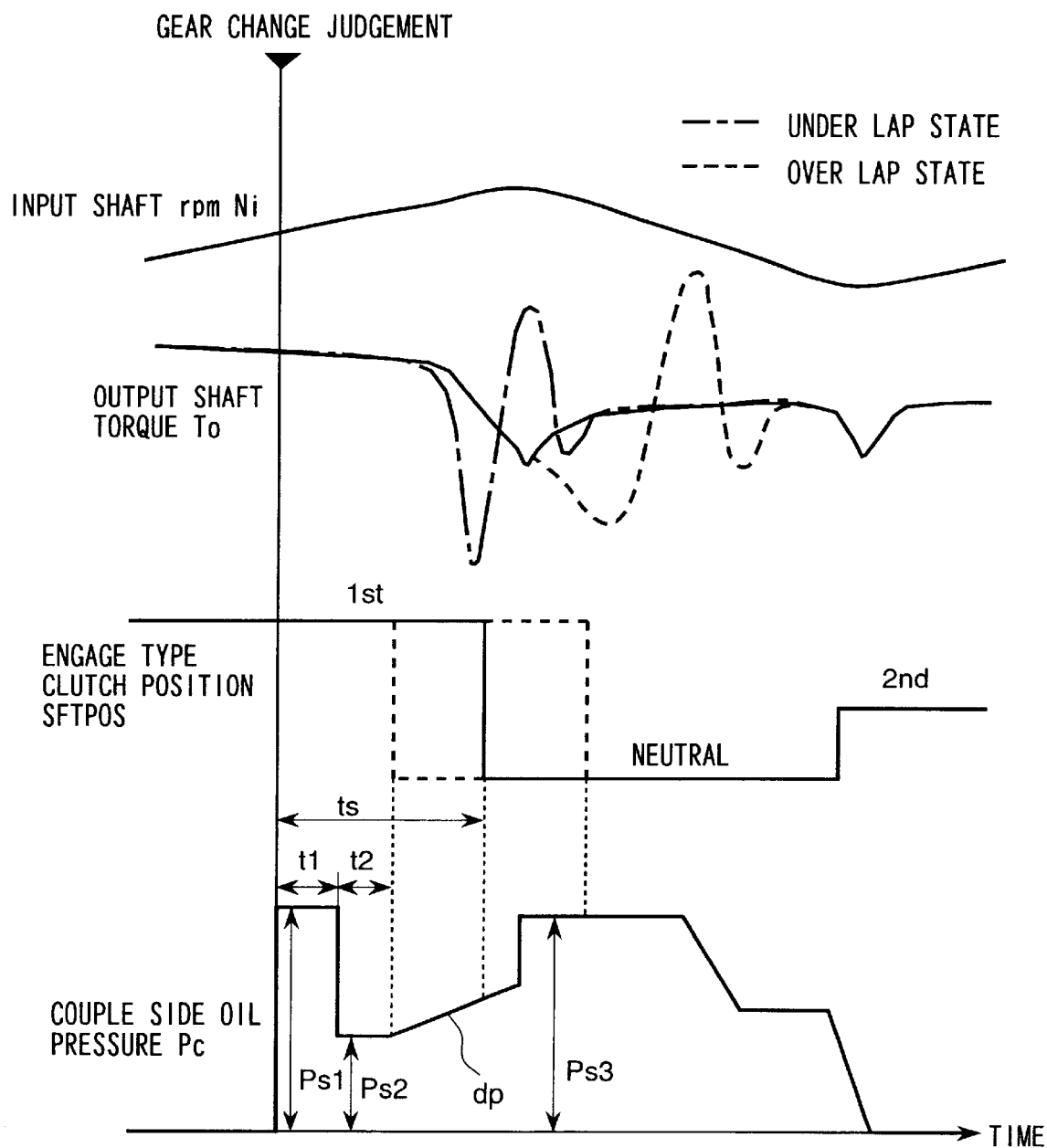
FIG. 2 is a schematic diagram showing a change gear characteristic during an up-shift by means of a general and conventional control method and further showing an influence when a clutch release timing is deviated.

FIG. 2 is a schematic diagram showing a change gear characteristic during an up-shift by means of a general and conventional control method and further showing an influence when a clutch release timing is deviated. In other words, FIG. 2 is a time chart when upshifting under a condition that a driver keeps depressing the acceleration pedal at a predetermined position (a power on condition).

According to a throttle valve opening degree TVO of the electronically controlled throttle 2 which is controlled based on the acceleration pedal operation by a driver and an output shaft rpm No detected by the rpm sensor 36 and based on a change gear map stored in the control device 37, a change gear judgement, for example, an upshift judgement 1→2 change gear, is effected. Then, a change gear control is started for the friction clutch 19 to be coupled and the claw type clutches 25 and 26 to be released.

At the same time when the change gear is started, a control signal is outputted to the actuator 33 so that the hydraulic pressure (a coupling side hydraulic pressure) Pc to the friction clutch 19 assumes a predetermined high pressure Ps1. The predetermined high pressure (precharge pressure) Ps1 is set at a hydraulic pressure necessary for charging a hydraulic pressure chamber in the piston 20 and is kept for a predetermined time t1. When the predetermined time t1 has passed, the coupling side hydraulic pressure Pc is set at a predetermined hydraulic pressure Ps2, which is set at a value immediately before the friction clutch 19 acquires a torque capacity and is kept until the predetermined time t2 has passed. When the predetermined time t2 has passed, the coupling side hydraulic pressure Pc is caused to sweep up with a predetermined slope dp to thereby gradually increase the torque capacity of the friction clutch 19.

Now, when a predetermined time ts has passed after the change gear judgement, the position command SFTPOS to the claw type clutch 25 is switched from 1st gear to the neutral state, and through control of the actuators 31 and 32 the claw type clutches 25 and 26 are released.

After the claw type clutches 25 and 26 are released, the coupling side hydraulic pressure Pc is set at a predetermined hydraulic pressure Ps3, and a feed back control is performed so that the input shaft rpm Ni converges to a target value.

The wave form indicated by a solid line in FIG. 2 represents an optimum timing of the clutch switching, and a desirable change gear characteristic with no output shaft variation is realized. On one hand, the wave form indicated by a one dot and chain line in FIG. 2 represents a under lap condition. In this under lap condition, since the claw type clutches 25 and 26 are released under a condition no torque capacity is yet acquired in the friction clutch 19, a load is suddenly applied on the output shaft 6 and resultantly a torque variation is caused. On the other hand, the wave form indicated by a broken line in FIG. 2 represents an over lap condition. The over lap condition is caused in a way that nevertheless the friction clutch 19 acquires a sufficient torque capacity, the claw type clutches 25 and 26 are not released and the both are kept in a coupled condition, and the load applied to the output shaft 6 suddenly decreases and resultantly a torque variation is induced.

As has been explained above, if the releasing of the claw type clutches 25 and 26 is not performed after recognizing a timing when the friction clutch 19 acquires a predetermined torque capacity at the time of clutch switching, such as the under lap condition and the over lap condition are caused, thereby, a feeling at the time of change gear is extremely deteriorated.

Figure 3:
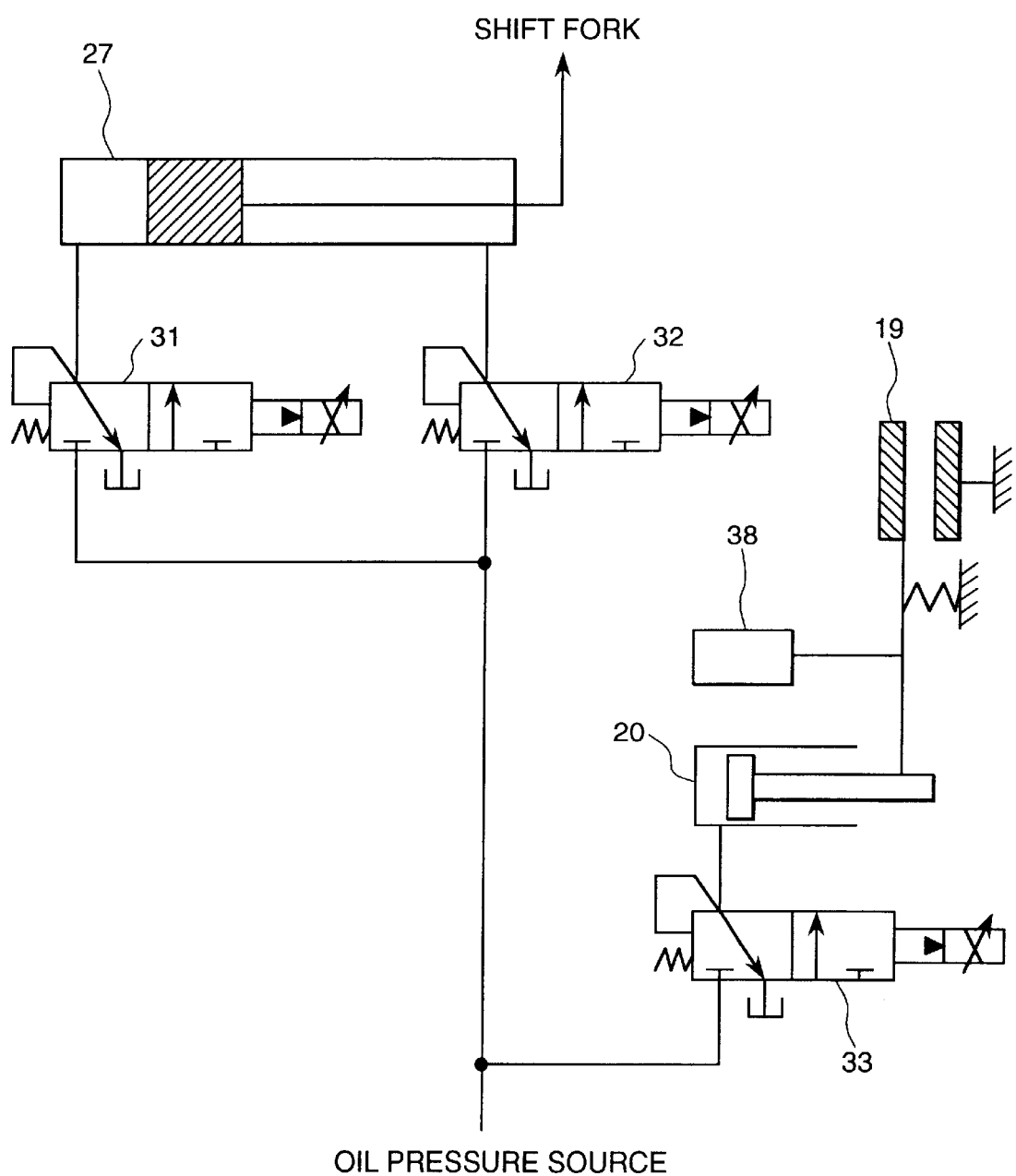
FIG. 3 is an example of a clutch torque capacity detection means at a coupling side which is used in a control device for an automatic transmission of the embodiment according to the present invention.

FIG. 3 is an example of a clutch torque capacity detection means at a coupling side which is used in a control device for an automatic transmission of the embodiment according to the present invention.

The claw type clutches 25 and 26 are controlled by the actuators 31 and 32 as shown in FIG. 3. In this embodiment a proportional solenoid type pressure control valve is used through which a hydraulic pressure proportional to a current flowing through a coil is outputted and with which a highly accurate hydraulic pressure control can be realized. With the hydraulic pressure outputted from the pressure control valve the shift fork interlocked with the piston of the cylinder 27 is stroked and the claw type clutches 25 and 26 are operated, for example, to a condition 1st gear-neutral-2nd gear. Further, when a hydraulic pressure more than a predetermined value is outputted from the two pressure control valves, the claw type clutches 25 and 26 are rendered into a neutral state. The stroke of the cylinder is controlled by taking in a signal SFTSEN from a position sensor (not shown) into the control device 37, in that the pressure control valves are feed-back controlled so that the claw type clutches 25 and 26 keep a predetermined position. Further, when the claw type clutches 25 and 26 completely stroke to a predetermined gear position and are fitted thereinto, the operation of the pressure control valves can be turned off in order to reduce power consumption in the pressure control valves, because fitted condition can be mechanically held.

On one hand, the actuator 33 for controlling the friction clutch 19 likely uses a proportional solenoid type pressure control valve. With the hydraulic pressure outputted from the pressure control valve a piston (not shown) in the friction clutch 19 is operated, thereby, a drive force is transmitted while pressing friction plates (not shown) of the friction clutch 19. In the present embodiment, a hydraulic pressure sensor 40 which detects a hydraulic pressure acting on the friction clutch 19 is provided in a hydraulic pressure pipe line to the friction clutch 19. A torque capacity Tc generated at the clutch portion is calculated according to the following equation (1).

$$Tc = \mu \cdot R \cdot N (A \cdot Pc - F) \tag{1}$$

wherein $\mu$: friction coefficient

R: effective radius of clutch

N: number of plates

A: pressure receiving area of piston

Pc: operation hydraulic pressure for clutch

F: reaction force of clutch

Through detection of the hydraulic pressure acting on the friction clutch 19 by the hydraulic pressure sensor 40, the torque capacity acquired by the friction clutch 19 is calculated, thus an optimum timing for releasing the claw type clutches 25 and 26 can be determined.

Figure 4:
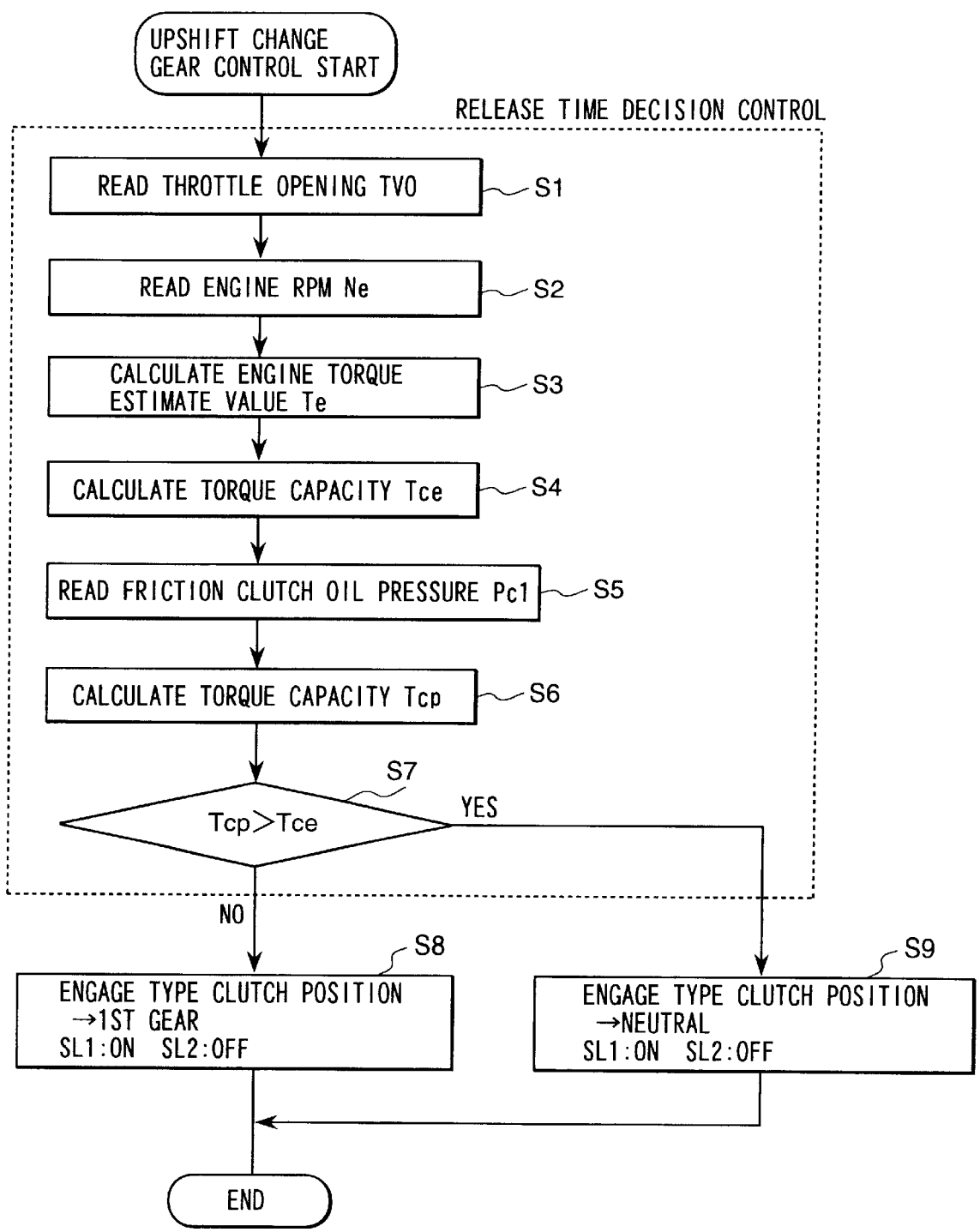
FIG. 4 is a flow chart showing processing contents performed in the control device for the automatic transmission of the embodiment according to the present invention.

FIG. 4 is a flow chart showing processing contents performed in a release side clutch release timing decision means 39 used in the control device for the automatic transmission of the embodiment according to the present invention.

In association with the start of an up shift change gear control, a release timing decision control is immediately initiated, and a throttle vale opening degree TVO and an engine rpm Ne from various sensors are read (S1 and S2). Subsequently, an engine torque estimation value Te outputted from the engine 1 is calculated according to the read value and based on characteristics of the engine 1 determined experimentally in advance (S3). Then, a torque capacity Tce applied from the engine side to the claw type clutch 25 is calculated according to the calculated Te (S4). Further, with the hydraulic pressure sensor 40 a hydraulic pressure Pc1 acting on the friction clutch 19 is read (S5). Subsequently, a torque capacity Tcp which is generated by the hydraulic pressure at the friction clutch 19 and is applied to the claw type clutch 25 is calculated.

Then, the Tce and the Tcp are compared (S7), and if Tcp is below Tce (Tcp≦Tce), it is judged that the torque capacity of the friction clutch 19 is insufficient and a hydraulic pressure command is outputted to the actuators 31 and 32 so that the claw type clutch 25 is held at 1st gear condition (S8). On the other hand, if Tcp exceeds Tce, namely Tcp exceed a predetermined value (Tcp>Tce), it is judged that the torque capacity of the friction clutch 19 has reached to the predetermined value, a hydraulic pressure command is outputted to the actuators 31 and 32 to render the claw type clutch 25 into a neutral state (S9). As an alternative, the inequation ">" in step S7 can be replaced by an inequation "≧".

As has been explained hitherto, through detection of a torque capacity generated in a clutch to be coupled by making use of a hydraulic pressure sensor, a clutch switching timing during change gear can be easily matched with a high accuracy, thereby, a desirable change gear characteristic can be realized.

Figure 5:
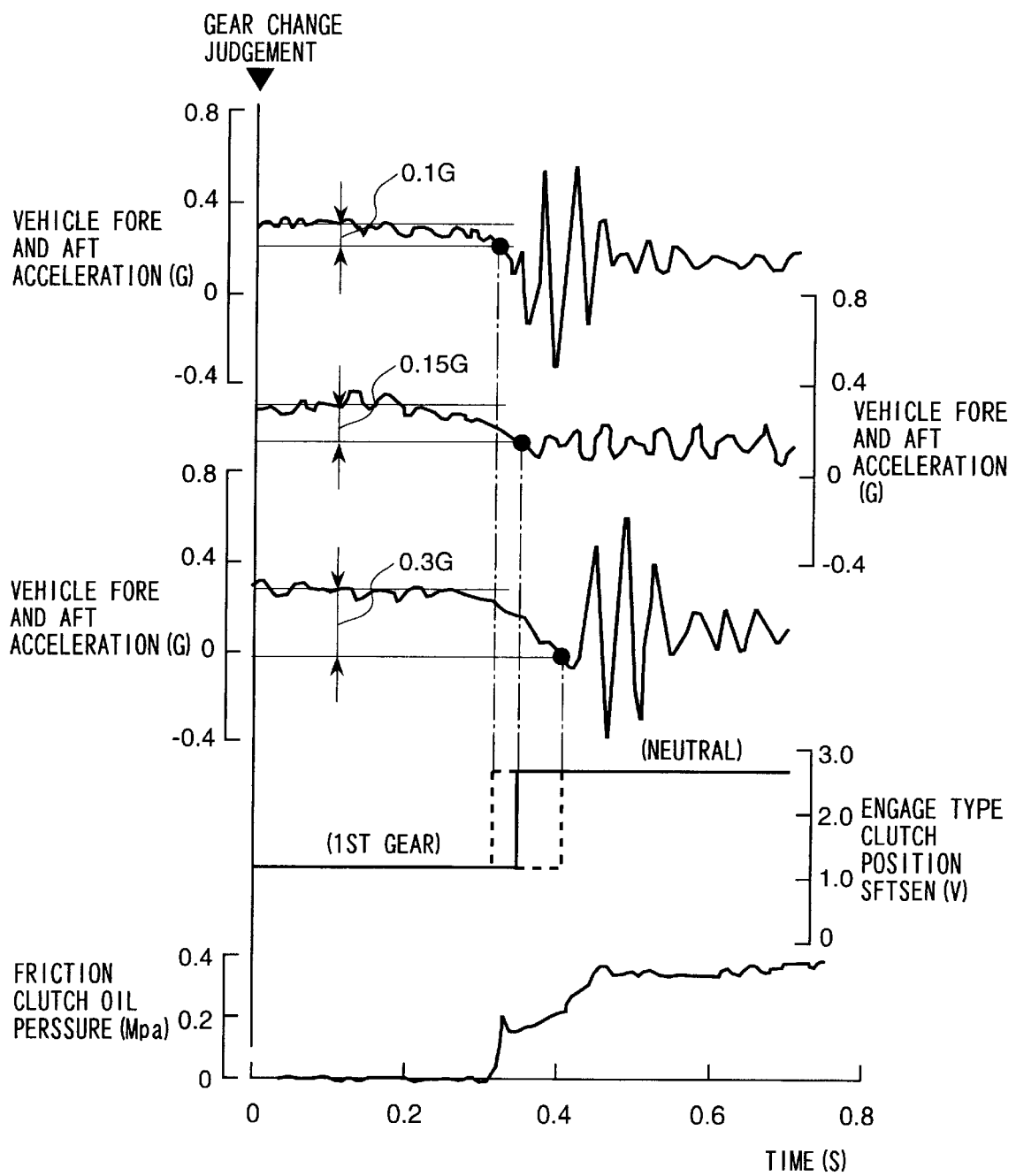
FIG. 5 shows an experimental result obtained according to a second embodiment of the present invention which uses an acceleration sensor for the torque capacity detection means.

FIG. 5 shows an experimental result obtained according to a second embodiment of the present invention which uses an acceleration sensor for the torque capacity detection means used in a control device for an automatic transmission.

After installing the acceleration sensor on a vehicle, an acceleration of vehicle longitudinal direction during a change gear is measured therewith and a torque capacity of the friction clutch 19 to be coupled is detected. More specifically, as illustrated in FIG. 5, an average value of longitudinal direction acceleration after a change gear judgement is calculated and using the calculated average value as a reference a timing when a longitudinal direction acceleration drops below a predetermined value is determined as a release timing of the claw type clutch. In the experiment, the coupling side hydraulic pressure is fixed, release timing is varied while setting the predetermined values respectively as 0.1G, 0.15G and 0.3G and the change gear characteristics for the respective instances are compared as illustrated in FIG. 5.

As will be apparent from FIG. 5, it will be understood that through judgement of levels of the longitudinal direction acceleration during change gear an under lap condition (set value: 0.1G) and an over lap condition (set value: 0.3G) are avoided, and a desirable change gear characteristics (set value: 0.15G) can be obtained. Therefore, it is sufficient if the set value is adapted depending on the driving conditions.

Figure 6:
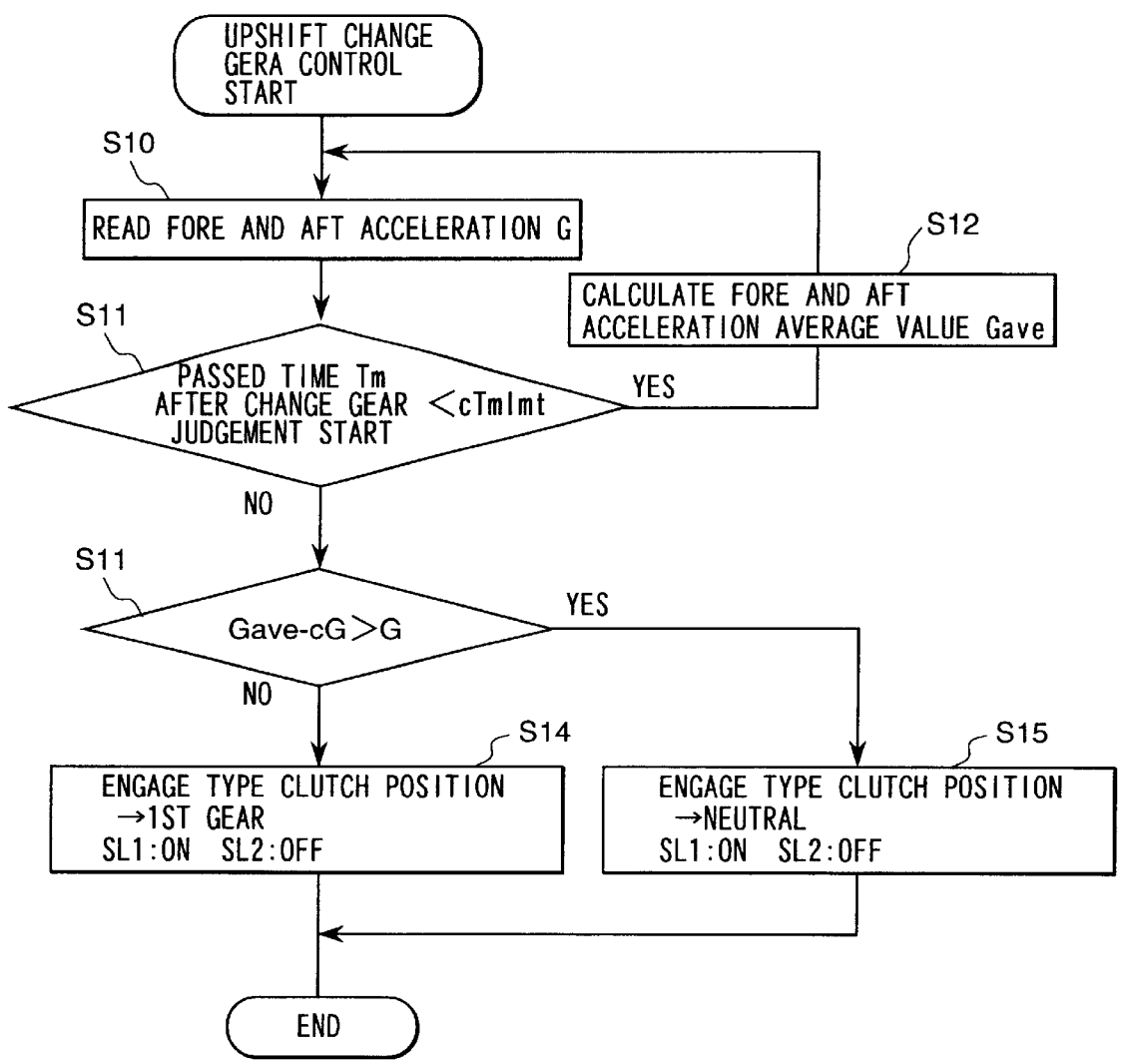
FIG. 6 is a flow chart showing processing contents in the control device for the automatic transmission according to the second embodiment of the present invention.

FIG. 6 is a flow chart showing processing contents in a clutch release timing decision means in the control device for the automatic transmission according to the second embodiment of the present invention.

In association with the start of the up shift change gear control, at first a vehicle longitudinal direction acceleration G is read from the acceleration sensor (S10). Subsequently, it is judged whether the lapsed time Tm after the change gear judgement is below a predetermined average value calculation period cTmLmt (S11). If the result of the judgement is YES, an average value Gave of the longitudinal direction acceleration G is calculated, and again the reading of G is performed (S10).

Figure 7:
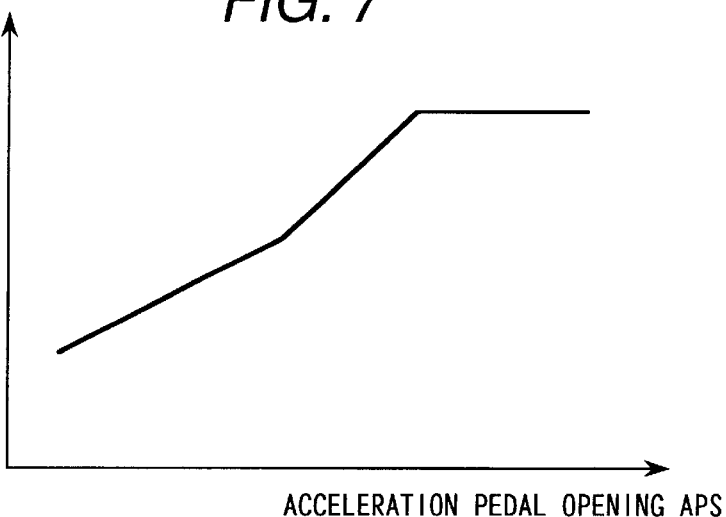
FIG. 7 is a map for a clutch release determining means provided in the control device according to the second embodiment of the present invention.

Further, the above period is exceed, a judgement of release timing decision of the claw type clutch 25 is made (S13). More specifically, the judgement according to the following inequation (2) is made.

$$Gave-cG>G \qquad (2)$$

wherein, cG is a longitudinal direction acceleration at the moment of the release timing judgement, in that the value for deciding the release timing of the claw type clutch 25 after detecting that the friction clutch 19 to be coupled has acquired a predetermined torque capacity. As illustrated in FIG. 7, the above cG is a table data provided for every acceleration pedal opening degree, which are in advance determined experimentally and stored in the control device 37. The above table data are provided for every change gear pattern, for example, 1st gear-2nd gear and 2nd gear-3rd gear.

In the present embodiment, when the longitudinal direction acceleration G does not drop below the judgement level, it is judged that the torque capacity of the friction clutch 19 is insufficient and a hydraulic pressure command to the actuators 32 and 33 is outputted so as to hold the claw type clutch 25 at 1st gear state (S14). On the other hand, the longitudinal direction acceleration G drops below the judgement level, it is judged that the torque capacity of the friction clutch 19 has reached to the predetermined value and a hydraulic pressure command is outputted to the actuators 32 and 33 so as to release the claw type clutch 25 and render to a neutral state (S15). The steps S13 through S15 are the same as the steps S7 through S9 in FIG. 4.

As has been explained above, through the decision of an optimum timing for releasing the claw type clutch by making use of the signals from the acceleration sensor, the clutch switching timing during a change gear can be matched with the non expensive structure, thereby, the feeling during the change gear can be enhanced.

Figure 8:
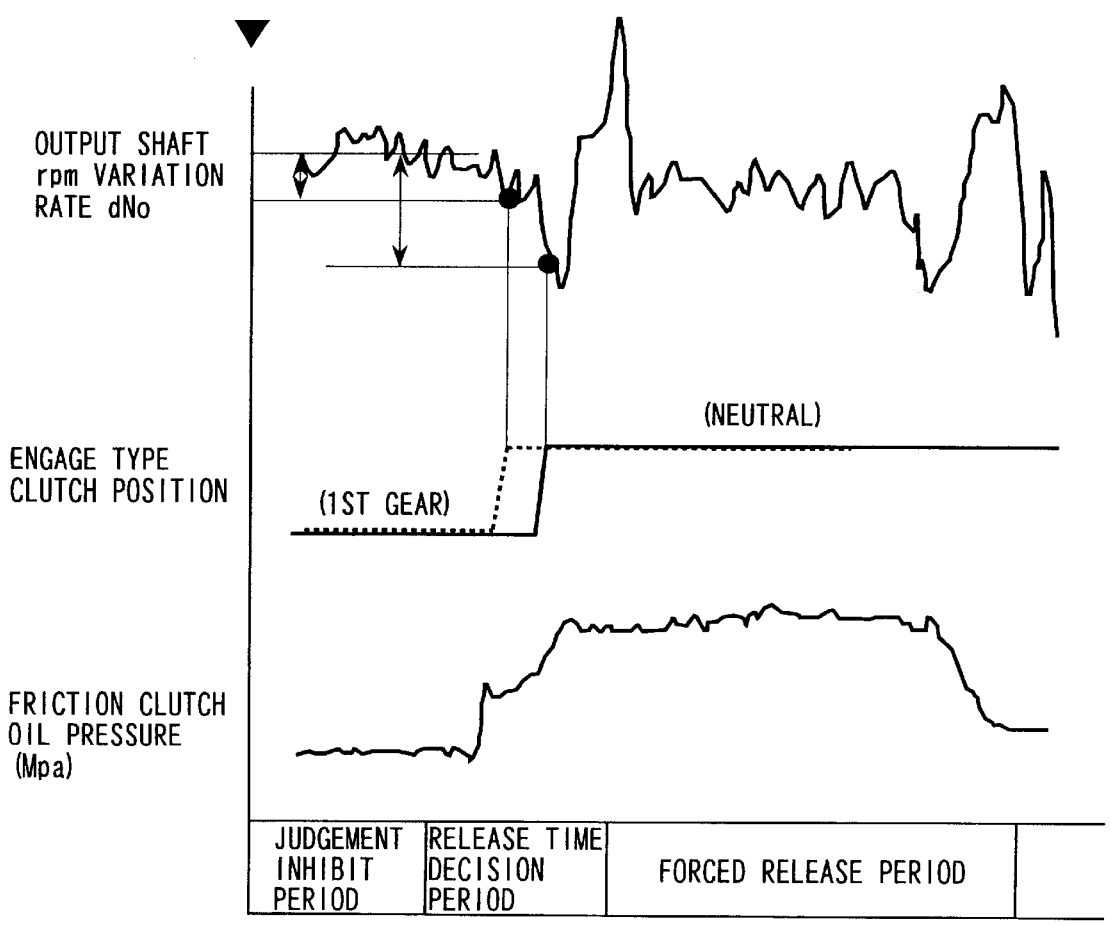
FIG. 8 is a time chart showing an operation according to a third embodiment of the present invention in which an output rpm variation rate is used for the control.

FIG. 8 is a time chart showing an operation according to a third embodiment of the present invention in which an output rpm variation rate is used for the torque capacity detection means used in the control device for the automatic transmission.

A differential value of the out put shaft rpm No which is detected by the rpm sensor 36, in that output shaft rpm variation rate dNo, is calculated and a torque capacity of the friction clutch 19 to be coupled is determined by making use of the above dNo during a change gear. More specifically, like the processing of the acceleration sensor signals in the above, an average value of the output shaft rpm variation rate dNo after the change gear judgement is calculated as illustrated in FIG. 8, and by making use of the calculated average value as reference the timing when dNo drops below the predetermined value is determined for the release timing for the claw type clutch.

Now, when calculating dNo, an erroneous judgement for the release timing can be caused depending on load conditions where the vehicle is running due to noises. Therefore, a judgement prohibition period for a predetermined time after the change gear judgement is provided in which the judgement of release is prohibited, and in which period the above referred to average is calculated. Thereafter, the level judgement of dNo during the release timing judgement period is executed. Further, when the release timing judgement is restricted for some reasons, the releasing of the friction clutch 25 is prevented to cause an extreme over lap condition and possibly to damage the transmission. Therefore, when no release timing judgement is effected after having passed a predetermined time from the change gear judgement, an operation of forcedly executing clutch release is performed.

As has been explained above, through the decision of an optimum timing for releasing the claw type clutch by making use of the rpm variation rate, the clutch switching timing during a change gear can be matched with the non expensive structure, thereby, the feeling during the change gear can be enhanced. Through prohibiting the release timing judgement for a predetermined time after the change gear judgement, the clutch switching timing can be correctly detected while eliminating external disturbances such as steps on a load surface.

Figure 9:
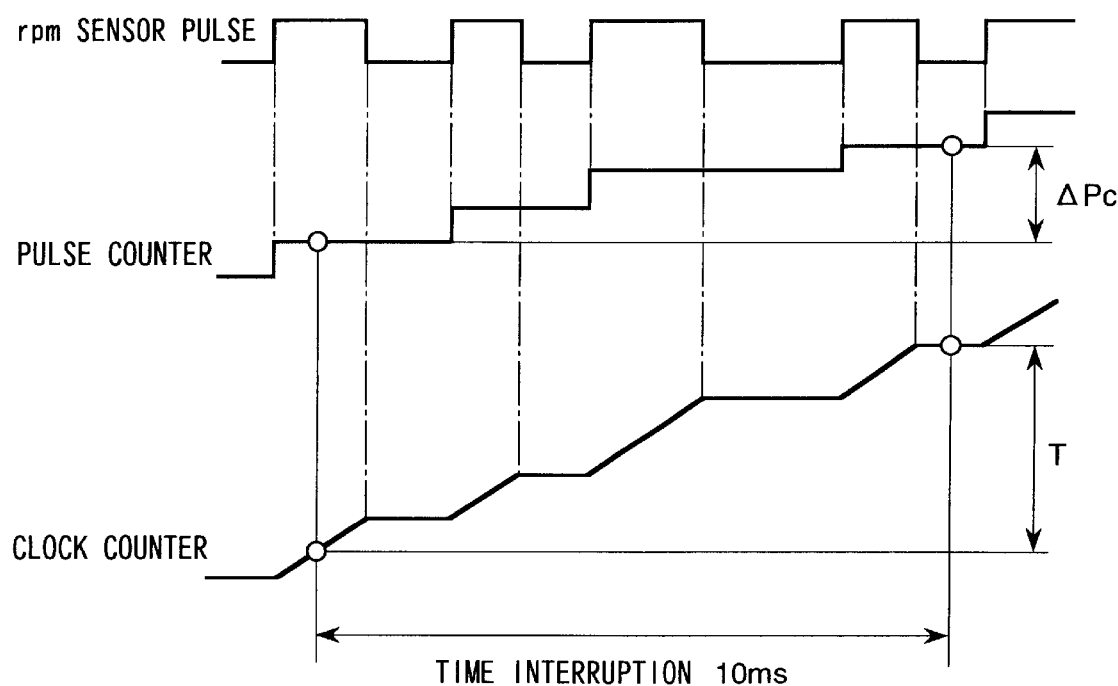
FIG. 9 is a time chart showing an operation for detecting rpm with a high accuracy in a control device for an automatic transmission in one embodiment of the present invention.

FIG. 9 is a time chart showing an operation for detecting rpm with a high accuracy in a control device for an automatic transmission in one embodiment of the present invention.

When calculating the output shaft rpm variation rate, the output shaft rpm No serving as the base of the calculation is accurately detected for the control device 37. As illustrated in FIG. 9, rpm sensor pulses are outputted from the rpm sensor 36. A pulse counter counts the leading edges of the rpm sensor pulses to count up the same and further a clock counter performs counting up only in a period when the rpm sensor pulses are ON. The calculation of the output shaft rpm No is executed through time interruption for every predetermined period, for example 10 ms.

By making use of the value $\Delta Pc$ of the pulse counter and the value T of the clock counter, the output shaft rpm No is calculated according to the following equation (3).

$$No=T/\Delta Pc \qquad (3)$$

Through the calculation of the output shaft rpm as has been explained above, the rpm detection accuracy in a low rpm region is enhanced as well as an interruption load in a high rpm region can be reduced.

According to the present invention, even if an early release or a tie-up is caused due to variations based on respective product differences and secular change, the claw type clutch is released to a neutral state after being detected that the friction clutch has acquired a predetermined torque capacity, therefore, a desirable clutch switching during a change gear is achieved and a stable feeling during the change gear can always be realized.

What is claimed is:

1. A control device for an automatic transmission comprising a torque transmitter provided between an input shaft and an output shaft of a gear transmission, wherein the torque transmitter in at least one change gear stage is constituted by a friction clutch, and the torque transmitter in other change gear stages is constituted by synchromesh clutches when performing a change gear from one change gear stage to another change gear stage, the friction clutch is controlled, a torque detector which detects or computes a transfer torque of the friction clutch when performing a change gear to a predetermined change gear stage, and a clutch release timing determiner which determines a timing when releasing the respective synchromesh clutch into a neutral state based on the value detected or computed by the transfer torque detector.

2. A control device for an automatic transmission according to claim 1, wherein the transfer torque detector is a hydraulic pressure sensor.

3. A control device for an automatic transmission according to claim 1, wherein the transfer torque detector is an acceleration sensor.

4. A control device for an automatic transmission according to claim 1, wherein the transfer torque detector uses an output shaft rpm variation rate.

5. A method of controlling an automatic transmission which includes a torque transmitter provided between an input shaft and an output shaft of a gear transmission, wherein the torque transmitter in at least one change gear stage is constituted by a friction clutch and in other change gear stages are constituted by synchromesh clutches, and when performing a change gear from one change gear stage to another change gear stage, the friction clutch is controlled, comprising detecting a torque capacity of the friction clutch when performing a change gear to a predetermined change gear stage, and determining a timing when releasing the respective synchromesh clutch into a neutral state based on the detection.

6. An automatic transmission comprising a torque transmitter provided between an input shaft and an output shaft of a gear transmission, wherein the torque transmitter in at least one change gear stage is constituted by a friction clutch and in other change gear stages are constituted by synchromesh clutches and when performing a change gear from one change gear stage to another change gear stage, the friction clutch is controlled, and wherein the mesh clutches are configured such that, when at a moment a transfer torque (Tcp) of the friction clutch, exceeds a calculated transfer torque (Tce) from the input shaft on one of the synchromesh clutches concerned at that moment, during a change gear to a predetermined change gear stage, the respective synchromesh clutch is released into a neutral state.

7. A control device for an automatic transmission, comprising a torque transmission operatively provided between an input shaft and an output shaft of a gear transmission, the torque transmission having a friction clutch in at least one change gear stage and a mesh clutch with synchromesh in other change gear stages, whereby the friction clutch is controlled when performing a change gear from one change gear stage to another change gear stage; a detector configured to detect or compute a transfer torque value of the friction clutch when performing a change gear to a predetermined change gear stage; and a clutch release timing determining device configured to determine a timing when releasing the respective mesh clutch into a neutral state based on the detected or computed value.

8. A control device according to claim 7, wherein the detector is a hydraulic pressure sensor.

9. A control device according to claim 7, wherein the detector is an acceleration sensor.

10. A control device according to claim 7, wherein the detector is configured to utilize an output shaft rpm variation rate.

11. A method of controlling an automatic transmission which includes a torque transmission provided between an input shaft and an output shaft of a gear transmission having a friction clutch in at least one change gear stage and mesh clutches with synchromesh in other change gear stages whereby the friction clutch is controlled when performing a change gear from one change gear stage to another change gear stage, comprising detecting a transfer torque of the friction clutch when performing a change gear to a predetermined change gear stage, and determining a timing when releasing the respective mesh clutch into a neutral state based on the transfer torque detection.

12. An automatic transmission, comprising a torque transmission operatively provided between an input shaft and an output shaft of a gear transmission having a friction clutch in at least one change gear stage and mesh clutches with synchromesh in other change gear stages whereby the friction clutch is controlled when performing a change gear from one change gear stage to another change gear stage, and the respective mesh clutch is arranged to be released into a neutral state when at a moment a torque capacity (Tcp) of the friction clutch exceeds a calculated transfer torque (Tce) from the input shaft, on one of the mesh clutches concerned at the moment during a change gear to a predetermined change gear stage.

* * * * *